United States Patent
Hakamata

(10) Patent No.: US 8,161,303 B2
(45) Date of Patent: Apr. 17, 2012

(54) STORAGE APPARATUS WITH POWER USAGE CONTROL FUNCTION AND POWER USAGE CONTROL METHOD IN STORAGE APPARATUS

(75) Inventor: Kazuo Hakamata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 916 days.

(21) Appl. No.: 12/033,331

(22) Filed: Feb. 19, 2008

(65) Prior Publication Data

US 2009/0147393 A1    Jun. 11, 2009

(30) Foreign Application Priority Data

Dec. 7, 2007    (JP) ................... 2007-317546

(51) Int. Cl.
*G06F 1/00* (2006.01)
*G06F 1/26* (2006.01)
*G06F 1/32* (2006.01)
*G11B 15/18* (2006.01)
*G11B 17/00* (2006.01)
*G11B 19/02* (2006.01)

(52) U.S. Cl. ............. 713/320; 713/300; 360/69

(58) Field of Classification Search .......... 713/300, 713/320
See application file for complete search history.

(56) References Cited

U.S. PATENT DOCUMENTS

| | | | |
|---|---|---|---|
| 7,861,102 B1 * | 12/2010 | Ranganathan et al. ....... | 713/300 |
| 2004/0003303 A1 * | 1/2004 | Oehler et al. ................. | 713/300 |
| 2005/0210304 A1 * | 9/2005 | Hartung et al. .............. | 713/320 |
| 2005/0259345 A1 | 11/2005 | Hakamata et al. | |
| 2007/0260815 A1 | 11/2007 | Guha et al. | |
| 2007/0300084 A1 * | 12/2007 | Goodrum et al. ............ | 713/300 |
| 2010/0011229 A1 * | 1/2010 | Davis et al. ................. | 713/300 |

FOREIGN PATENT DOCUMENTS

| | | |
|---|---|---|
| EP | 1 840 720 | 10/2007 |
| JP | 2000-149383 | 5/2000 |
| JP | 2000-293314 | 10/2000 |

OTHER PUBLICATIONS

Extended European Search Report in European Patent Application No. 08251962.0-2211 mailed Mar. 16, 2011.

* cited by examiner

*Primary Examiner* — Kim Huynh
*Assistant Examiner* — Brandon Kinsey
(74) *Attorney, Agent, or Firm* — Brundidge & Stanger, P.C.

(57) ABSTRACT

A storage apparatus includes plural trays each incorporating plural HDDs and a controller that controls access to the HDDs in response to an access request from a host apparatus. The controller also includes a table, in which standard power and a start-up power supply status are associated with each other for each of the trays, a table that manages total power required by the trays and present power consumed by the trays, and a table that defines maximum available power relative to the total power. The controller, when receiving a power-on setting request for a certain tray, judges whether or not the tray can be turned on based on the standard power for the tray and the present power, and the controller, upon determining that the tray can be turned on, turns on the tray.

16 Claims, 20 Drawing Sheets

FIG. 8

POWER SETTING TABLE 800

| ITEM | SETTING VALUE | SETTING STATUS |
|---|---|---|
| POWER | 4950 W | INVALID |
| RATIO | 50 % | VALID |
| NUMBER OF TRAYS | 10 TRAYS | INVALID |

FIG. 9

TRAY POWER MANAGEMENT TABLE 900

| TRAY NUMBER | STANDARD POWER | START-UP STATUS |
|---|---|---|
| 0 | 1200 W | ON |
| 1 | 1000 W | OFF |
| ⋮ | ⋮ | ⋮ |
| 20 | 2000 W | ON |

TRAY DETAIL TABLE 1000

| TRAY NUMBER (1001) | DRIVE NUMBER (1002) | STANDARD POWER (1003) | START-UP STATUS (1004) | RAID GROUP (1005) | SETTING STATUS (1006) |
|---|---|---|---|---|---|
| 0 | 0 | 110 W | ON | 0 | VALID |
|  | 1 | 110 W | OFF | 0 | INVALID |
|  | 2 | 90 W | OFF | 1 | INVALID |
|  | : | : | : | : | : |
|  | 15 | 100 W | OFF | 1 | INVALID |
| 1 |  |  | : |  |  |
| : |  |  | : |  |  |

APPARATUS POWER TABLE 1100

| | | |
|---|---|---|
| 1101 | TOTAL POWER | 10300 |
| 1102 | PRESENT POWER | 2000 |
| 1103 | TOTAL NUMBER OF TRAYS | 20 |
| 1104 | NUMBER OF VALID TRAYS | 5 |
| 1105 | DIAGNOSTIC POWER | 1000 |

STORAGE APPARATUS WITH POWER USAGE CONTROL FUNCTION AND POWER USAGE CONTROL METHOD IN STORAGE APPARATUS

CROSS-REFERENCES TO RELATED APPLICATIONS

This application relates to and claims priority from Japanese Patent Application No. 2007-317546, filed on Dec. 7, 2007, the entire disclosure of which is incorporated herein by reference.

BACKGROUND

1. Field of the Invention

The invention relates to a storage apparatus having a power usage control function, and a power usage control method in a storage apparatus.

2. Description of Related Art

Advancement of information society has brought about an enormous quantity of data, and storage apparatuses (storage subsystems) have further increasing their capacity accordingly. In order to deal with an increase in capacity of a storage apparatus, the addition of disk devices (hard disk drives) is promoted typically. The maximum power usage for the entire storage apparatus heavily depends on the number of hard disk drives disposed in the storage apparatus, and therefore, the addition of hard disk drives causes an increase in power consumption of the entire storage apparatus.

JP2000-293314 A discloses a storage system that controls power-saving operation (i.e., power-on/off and selection of a power-saving mode) after a predetermined time has passed since access from a host apparatus has stopped. Also, in the case of access from a host apparatus, if an access destination disk apparatus has been turned off, the storage system in JP2000-293314 A performs access after the disk apparatus is turned on.

JP2000-149383 A discloses a storage system that performs control so that a microprocessor in the storage system monitors the current power consumption during the operation of each group composed of disk devices; and when it is detected that the current power consumption increases to be equal to or more than a threshold value, the microprocessor cancels the operation of the disk devices to have the current power consumption remain equal to or less than the threshold value.

As described above, in order to deal with an increase in power consumption in a storage apparatus accompanied by an increase in storage capacity, the power consumption of the storage apparatus is controlled by suspending the power supply to a presently unnecessary disk device or canceling the operation of a disk device(s) if the power consumption exceeds a predetermined threshold value.

However, it may not be preferable that all the loaded hard disk drives are operated due to, for example, an environment where a storage apparatus is installed or a system administration policy. For example, when the maximum power usage for the storage apparatus exceeds the maximum allowable power for the floor on which the storage apparatus is installed, a breaker operates, which leads to unintended power disconnection.

SUMMARY

The present invention has an object to perform control of power usage for the entire storage apparatus by way of controlling operation (start-up) of individual hard disk drives (or a tray or casing accommodating the hard disk drives).

More specifically, the invention has an object to provide a storage apparatus with which a user (system administrator) can easily set available power for the storage apparatus (maximum available power) taking various circumstances into consideration.

The invention also has an object to provide a storage apparatus that prohibits start-up of a particular hard disk drive in order to operate the storage apparatus with power equal to or less than the maximum available power.

Also, there is a known problem where, as a result of its properties, a hard disk drive may not be restarted after it has been left suspended for a long time. Therefore, even when the start-up of a particular hard disk drive is intentionally prohibited, it is desirable that the hard disk drive is regularly operated for a self-diagnostic. In view of the above, the invention has an object to provide a storage apparatus in which a hard disk drive for which start-up is prohibited can be operated for a self-diagnostic even when the maximum available power is set in the storage apparatus.

In order to achieve the above objects, the invention is characterized in that: the maximum available power is set in a storage apparatus; and control is performed so that the start-up of a particular tray unit or hard disk drive incorporated in the tray unit is prohibited so as to have the storage apparatus operate at power not exceeding the maximum available power.

More specifically, according to an aspect of the invention, provided is a storage apparatus including: plural tray units each incorporating plural disk drives; and a controller that controls access to the disk drives in response to an access request from a host apparatus, in which the controller includes: a tray power management table in which standard power and a start-up power supply status are associated with each other for each of the tray units; an apparatus power table that manages total power required by the tray units and present power consumed by the tray units; and a power setting table that defines maximum available power relative to the total power. When receiving a power-off setting request to at least one tray unit of the tray units, the controller judges whether or not the at least one tray unit can be turned off based on the standard power for the at least one tray unit in the tray power management table and the present power in the apparatus power table, and as a result, the controller, when determining that the at least one tray unit can be turned off, performs control to turn off the at least one tray unit.

Accordingly, the start-up of a predetermined tray unit is prohibited, and therefore, the storage apparatus can be operated within the range of the maximum available power.

According to another aspect of the invention, provided is a management apparatus that manages a storage apparatus including: plural tray units each incorporating plural disk drives; and a controller that controls access to the disk drives in response to an access request from a host apparatus. The management apparatus provides a user with a user interface for setting maximum available power relative to total power required by the tray units, and is configured so that the maximum available power is set for the controller based on the maximum available power input via the user interface.

Accordingly, a system administrator can easily set the maximum available power relative to the total power required by the storage apparatus.

According to still another aspect of the invention, the invention can be recognized as a method invention. More specifically, the invention provides a power control method in a storage apparatus including: plural tray units each incorporating plural disk drives; and a controller that controls access to the disk drives in response to an access request from a host apparatus. The power control method includes the steps of: providing, under the control of the controller, a tray power management table in which standard power and a start-up power supply status are associated with each other for each of the tray units; an apparatus power table that manages total power required by the tray units and present power consumed by the tray units; and a power setting table that defines maximum available power relative to the total power; receiving, under the control of the controller, a power-off setting request to at least one tray unit of the tray units; judging, under the control of the controller, whether the at least one tray unit can be turned off based on the standard power for the at least one tray unit in the tray power management table and the present power; and performing control, under the control of the controller, to turn off the at least one tray unit when determining that the at least one tray unit can be turned off in the judgment step.

According to the invention, a system administrator can easily set the maximum available power for a storage apparatus taking various circumstances into consideration.

Also, according to the invention, the start-up of a hard disk drive (or tray) is prohibited, limiting the number of simultaneously operating hard disk trays, and this can suppress the power usage for the entire storage apparatus.

Other aspects and advantages of the invention will be apparent from the following description and the appended claims.

BRIEF DESCRIPTION OF THE DRAWINGS

FIG. 8 is a diagram explaining an example of a power setting table held in memory in a controller according to an embodiment of the invention.

FIG. 9 is a diagram explaining an example of a tray power management table stored in memory in a controller according to an embodiment of the invention.

FIG. 10 is a diagram explaining an example of a tray detail table stored in memory in a controller according to an embodiment of the invention.

DETAILED DESCRIPTION OF PREFERRED EMBODIMENTS

An embodiment of the invention will be described with reference to the accompanying drawings.

Figure 1:
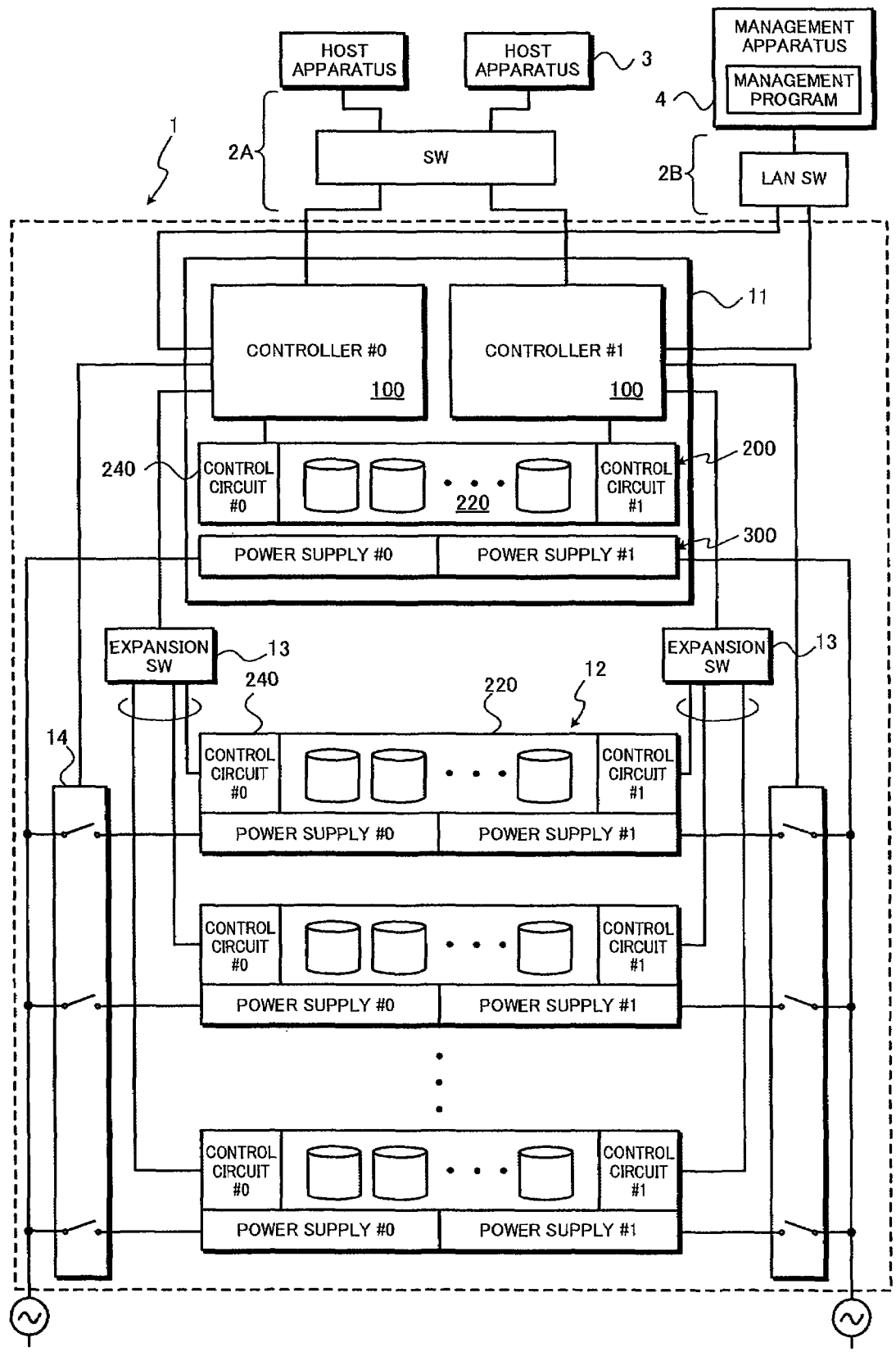
FIG. 1 is a diagram explaining the entire configuration for a storage apparatus according to an embodiment of the invention.

FIG. 1 is a diagram explaining the entire configuration for a storage apparatus according to an embodiment of the invention. A storage apparatus 1 shown in FIG. 1 is operatively connected to host apparatuses 3 via a network 2A, thereby forming a computer system. The storage apparatus 1 is also operatively connected to a management apparatus 4 via a management network 2B.

The network 2 may be composed of, any of a LAN, the Internet, and a SAN (Storage Area Network), and is typically configured to include a network switch, a hub, and the like. In this embodiment, it is assumed that the network 2A is composed of a SAN (FC-SAN) using Fiber Channel Protocol; and the management network 2 is composed of a LAN.

Each of the host apparatuses 3 is a computer for executing desired processing. Each host apparatus 3 is provided with hardware resources such as a processor, a main memory, a communication interface, and a local input/output device, and software resources such as a device driver, an operating system (OS), and an application program (not shown in the figure). The host apparatus 3, under the control of a processor, executes various programs to realize desired processing in cooperation with the hardware resources. For instance, the host apparatus 3, under the control of the processor, executes an operation application program to access the storage apparatus 1, which will be described in detail, thereby realizing a desired operation system.

The storage apparatus 1 is an auxiliary storage apparatus that provides the host apparatus 3 with data storage ability. The storage apparatus 1 in this embodiment can operate in either a normal mode or a power management mode. The normal mode is a known operation mode in which the storage apparatus 1 operates without considering its maximum available power. In contrast, the power management mode is a mode, in which the storage apparatus 1 operates while considering its maximum available power.

Figure 2:
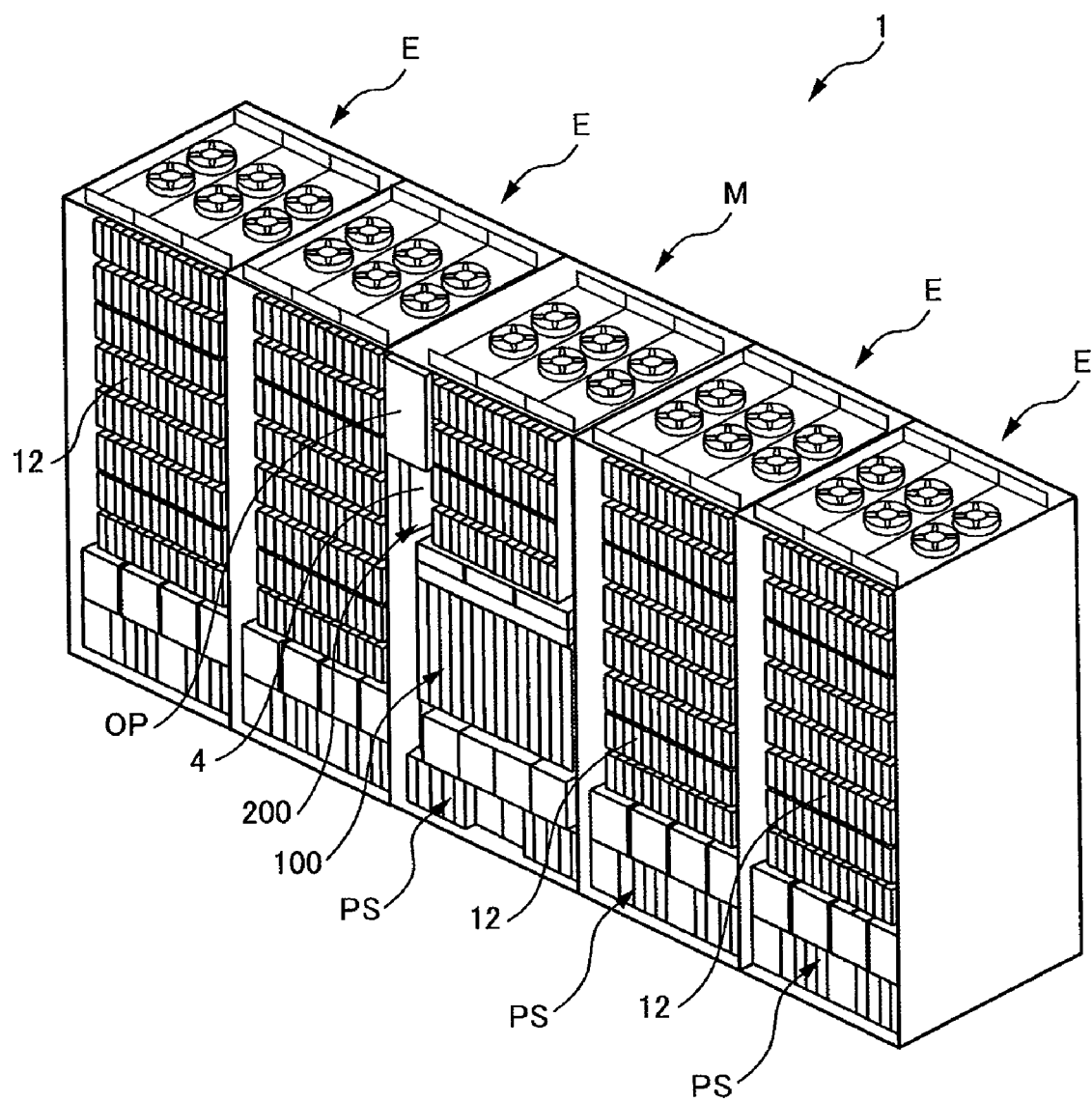
FIG. 2 is a perspective view showing a configuration for the appearance of a storage apparatus according to an embodiment of the invention.

The storage apparatus 1 is configured to include a main unit 11 and extension units 12. Each of the extension units 12 is connected to the basic unit 11 via extension switches 13. The main unit 11 and the extension units 12 are stacked in a rack, as shown in FIG. 2 described later. The internal configuration of the storage apparatus 1 is typically a redundant (dual in this embodiment) configuration in light of fault tolerance.

The main unit 11 includes: controllers 100 that control the operation of the entire storage apparatus 1 to process access requests from the host apparatus 3; a tray unit or casing unit (hereinafter simply referred to as "tray") 200 that accommodates hard disk drives 220 for storing data and control circuits 240 for controlling the driving of the hard disk drives 220; and power supply units 300 that supply power necessary for that driving.

Each of the extension units 12 has the same configuration as the basic unit 11 except that they do not include the controllers 100. More specifically, each extension unit 12 includes a tray 200 and power supply units 300. When adding hard disk drives 220 to the storage apparatus 1, the extension unit 12 is loaded in a rack in the storage apparatus 1 as appropriate, and is connected to the main unit 11 via the extension switches 13. In this way, the storage capacity for the storage apparatus 1 is expanded easily.

The hard disk drives 220 loaded in the storage apparatus 1 may constitute RAID groups based on a predetermined RAID configuration (e.g., RAID 5). The hard disk drives 220 belonging to the same RAID group are recognized as one virtual device. A known RAID technique can be utilized in the storage apparatus 1 in this embodiment.

The storage apparatus 1 is provided with power supply distribution boxes (PDB) 14. The power supply distribution boxes 14 distribute the power supplied from an external power supply to the power supply units 300 in a particular one of the extension units 12 under the control of the basic unit 11 (controllers 100). In this embodiment, the tray unit 200 in the basic unit 11 is controlled directly by the controllers 100, and not via the power supply distribution boxes 14.

The management apparatus 4 is an apparatus for a system administrator to manage the entire storage apparatus 1 with, and is typically composed of a general computer. The management apparatus 4 is a general computer installed with, for example, a management program. The management apparatus 4 is also called a service processor. In FIG. 1, the management apparatus 4 is provided outside the storage apparatus 1 via the management network 2B. However, the management apparatus 5 is not limited to this configuration, and may be provided in the storage apparatus 1. Alternatively, the controllers 100 each may be configured to include the same function as that for the management apparatus 4.

A system administrator gives an instruction to each of the controllers 100 via a user interface provided by the management apparatus 4. This enables a system administrator to acquire system configuration information for the storage apparatus 1 to refer to it, or to set/change the system configuration information. For instance, a system administrator can set a logical volume or a virtual volume or set a RAID configuration via the operation of the management apparatus 4 at the same time as the addition of the hard disk drives 220. In this embodiment, the management apparatus 4 is equipped with a power setting function for setting the maximum available power for the storage apparatus 1.

FIG. 2 is a perspective view showing a configuration for the appearance of the storage apparatus 1 according to an embodiment of the invention. In this embodiment, the storage apparatus 1 is composed of main rack M and plural extension racks E provided on both the sides. The main rack M is the minimum component necessary for allowing the storage apparatus 1 to achieve a data storage function, and each extension rack E is a rack for the addition of hard disk drives.

The above-described controllers 100 are disposed at the vicinity of the central part of the main rack M, and the trays 200 are disposed to be stacked above the controllers 100. Also, provided below the controllers 100 is a power feed system unit composed of an AC box for receiving an external power supply (e.g., three-phase AC 200 V) and/or a battery box. The AC box converts an input AC power supply to a DC power supply, lower the converted power supply to a prescribed voltage, and supplies the resultant voltage to the power supply units 300 (not shown in the figure).

The main rack M also contains the management apparatus 4. The management apparatus 4 is pulled from the inside of the main rack M when being used. Arranged on the front surface of the main rack M is operator panel OP that displays basic operation information for the storage apparatus 1.

A large number of trays 200 are loaded to be stacked in extension rack E. As is the same in the main rack M, a power feed system unit is arranged below the extension rack E.

Figure 3:
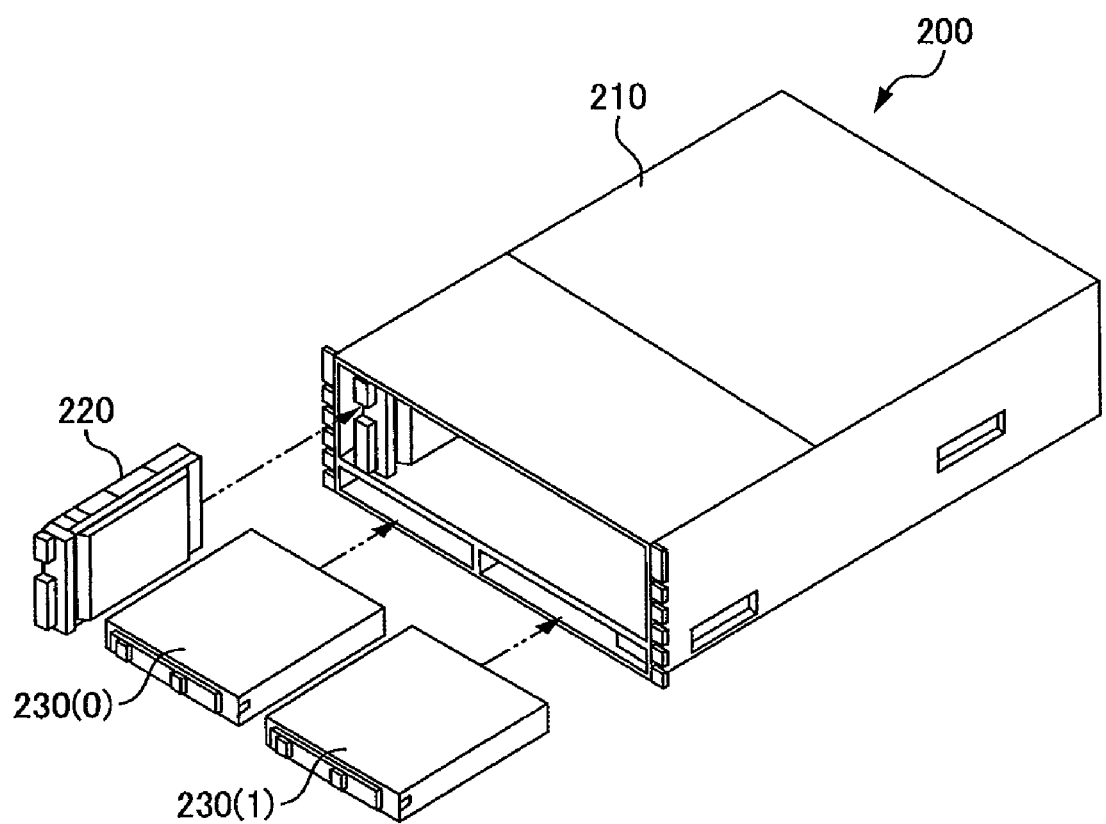
FIG. 3 is a front perspective view showing a configuration for the appearance of a tray according to an embodiment of the invention.

FIG. 3 is a diagram showing a configuration for the appearance of the tray 200 according to an embodiment of the invention, and is more specifically an exploded perspective view of the tray 200 seen from the front side.

As shown in FIG. 3, the hard disk drives 220 are fitted into the front part of a housing 210 in the tray 200. Also, battery packs 230 may be fitted into the housing 210. The dimensions of the housing 210 are determined to the large extent by the size and shape of fittable hard disk drives and the number of hard disk drives. In this embodiment, up to 16 hard disk drives 220 can be fitted into the housing 210.

Figure 4:
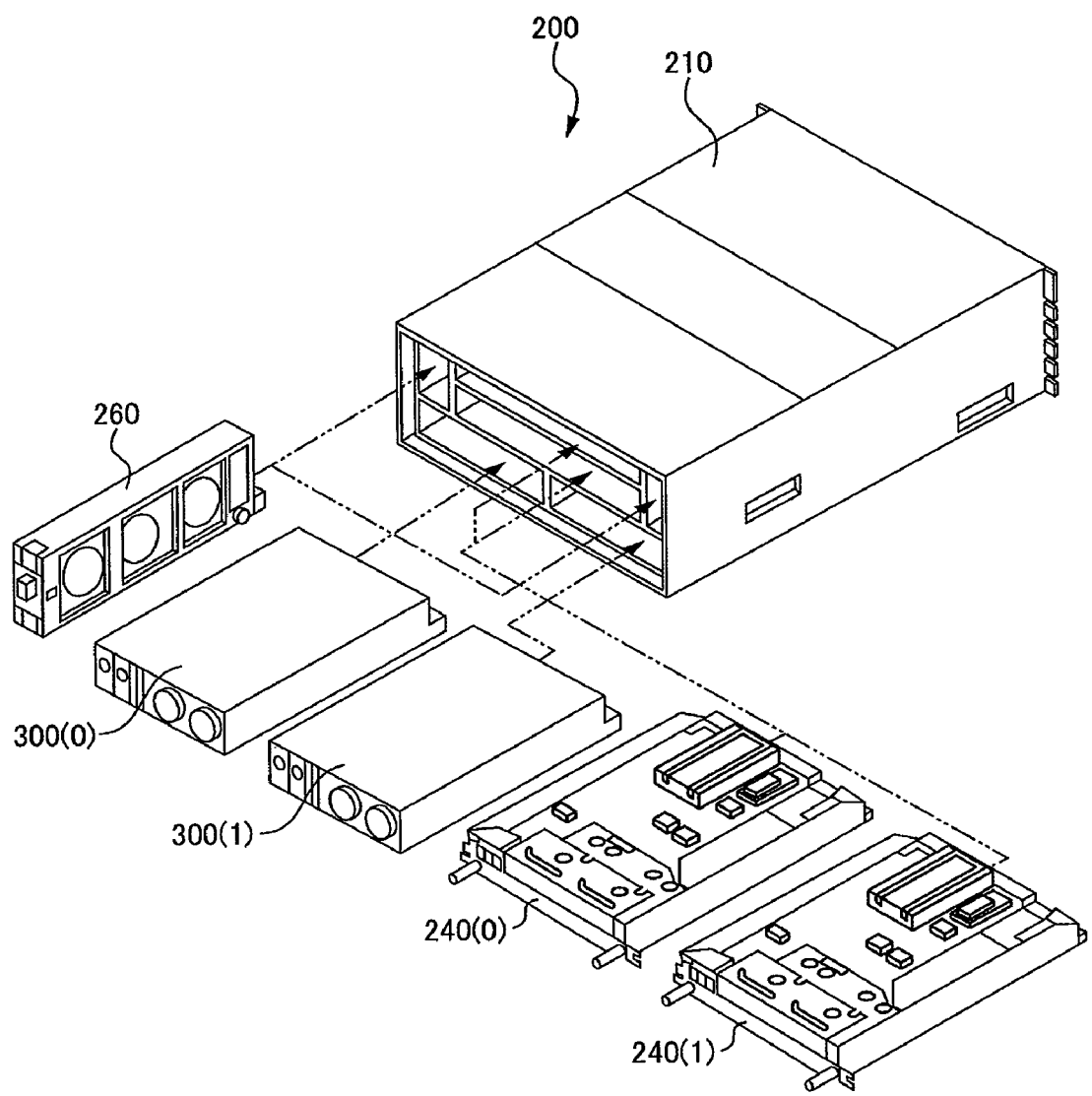
FIG. 4 is a rear perspective view showing a configuration for the appearance of a tray according to an embodiment of the invention.

FIG. 4 is a diagram showing a configuration for the appearance of the tray 200 according to an embodiment of the invention, and is more specifically a exploded perspective view of the tray 200 seen from the rear side.

As shown in FIG. 4, the dual control circuits 240 and power supply units are fitted into the back part of the housing 210. Also, fan assemblies 260 for cooling the temperature in the housing 210 may be provided at both the right and left ends of the back part of the housing 210.

Figure 5:
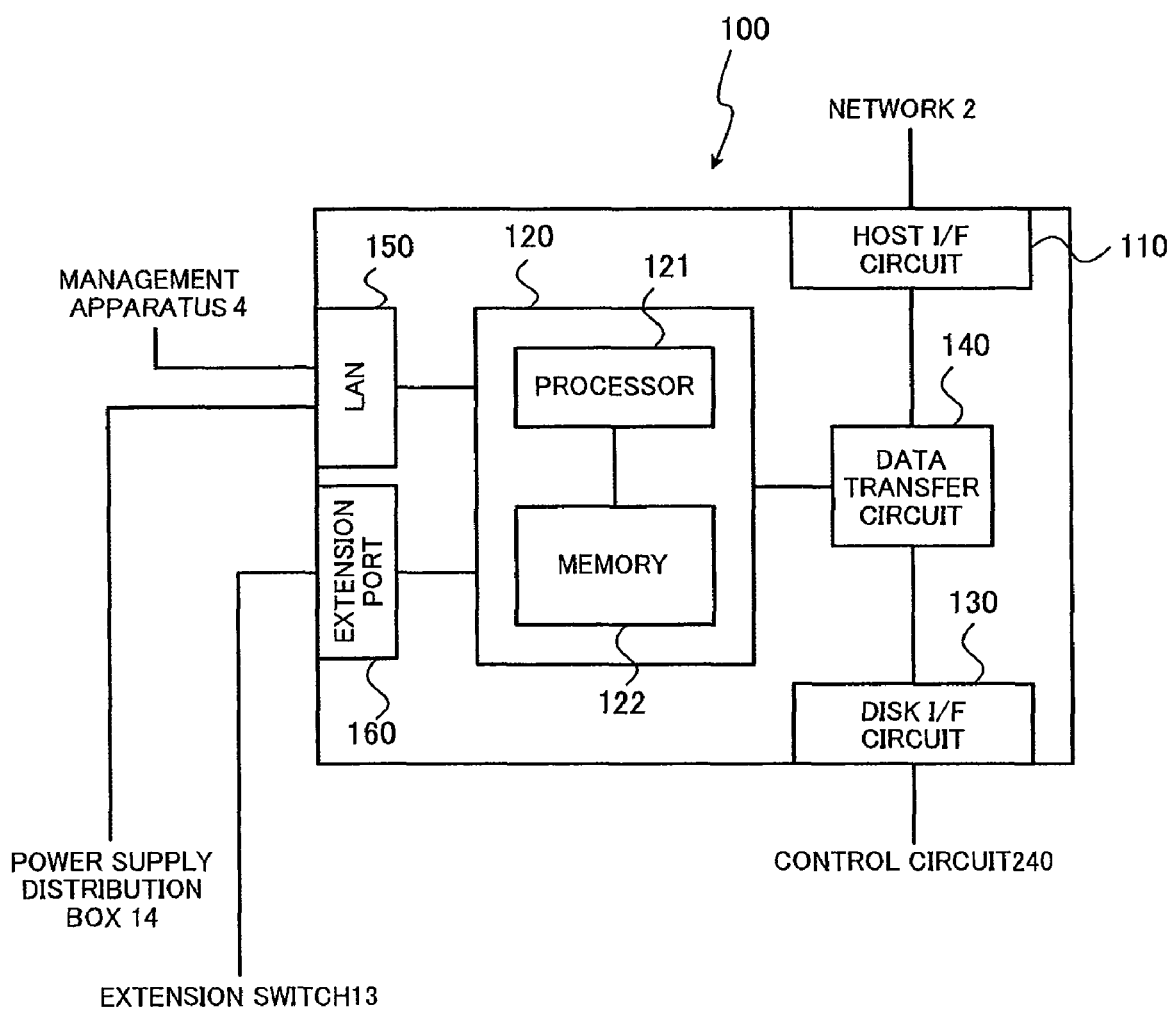
FIG. 5 is a diagram explaining a configuration for a controller in a storage apparatus according to an embodiment of the invention.

FIG. 5 is a diagram explaining a configuration for the controller 100 in the storage apparatus 1 according to an embodiment of the invention. The controller 100 is a component that controls the operation of the entire storage apparatus 1, and mainly functions to execute I/O processing based on an access request from the host apparatus 3. The controller 100 also executes processing concerning the management of the storage apparatus 1 in response to various requests from the management apparatus 4. In this embodiment, the controller 100 executes power management processing based on power management information, as will be described later.

As shown in FIG. 5, the controller 100 is provided with a host interface circuit 110, a main board 120, a disk interface circuit 130, a data transfer circuit 140, a LAN interface circuit 150, and an expansion port 160.

The host interface circuit 110 controls data communication with the host apparatus 3 via the network 2A. Upon receiving, e.g., a write request from the host apparatus 3, the host interface circuit 110 writes the write request and corresponding data to memory 122 in the main board 120 via the data transfer circuit 140.

The main board 120 includes one or more processors 121 and a memory 122, and, under the control of each processor 121, executes various control programs loaded in the memory 122 to control the operation of the entire controller 100 (i.e., storage apparatus 1). Each processor 121 may be a multicore type processor. Examples of the control programs include an I/O processing program, a system management program, and a power management program. The power management program is a program, under the control of the processor 121, for causing the controller 100 to achieve power management processing in combination with other hardware/software resources.

Figure 6:
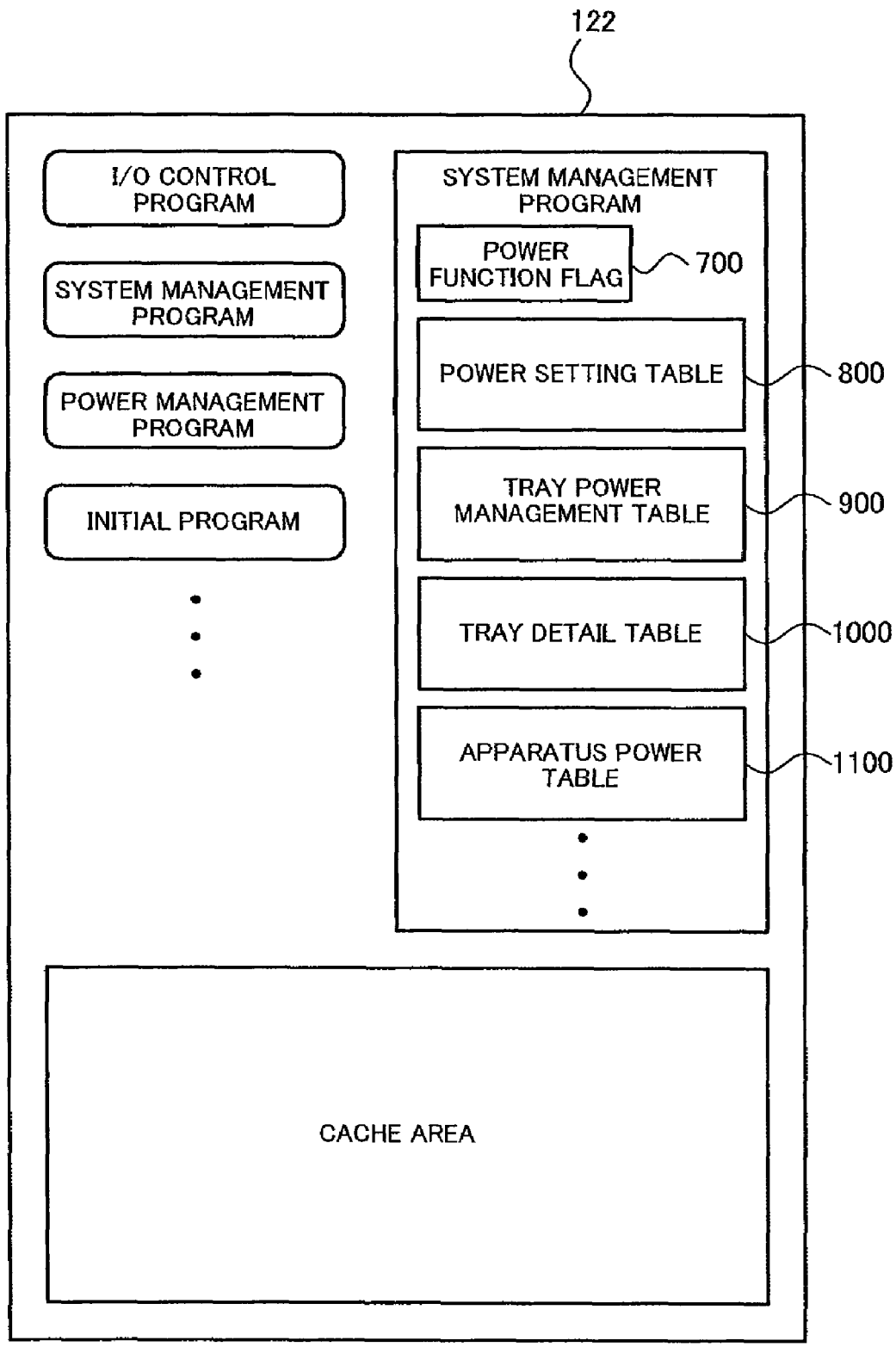
FIG. 6 is a diagram explaining the content of memory in a controller according to an embodiment of the invention.

The memory 122 mounted on the main board 120 is composed of, for example, volatile memory such as DRAM, or non-volatile memory such as flash memory. The memory 122 stores system configuration information and control information for the storage apparatus 1 itself, as shown in FIG. 6. For example, the system configuration information is read from a particular storage area in the hard disk drive 220, and is loaded in the memory 122 in accordance with an initial process after the storage apparatus 1 is turned on. The system configuration information includes, e.g., logical volume management information, RAID configuration information, and power management information.

Figure 7:
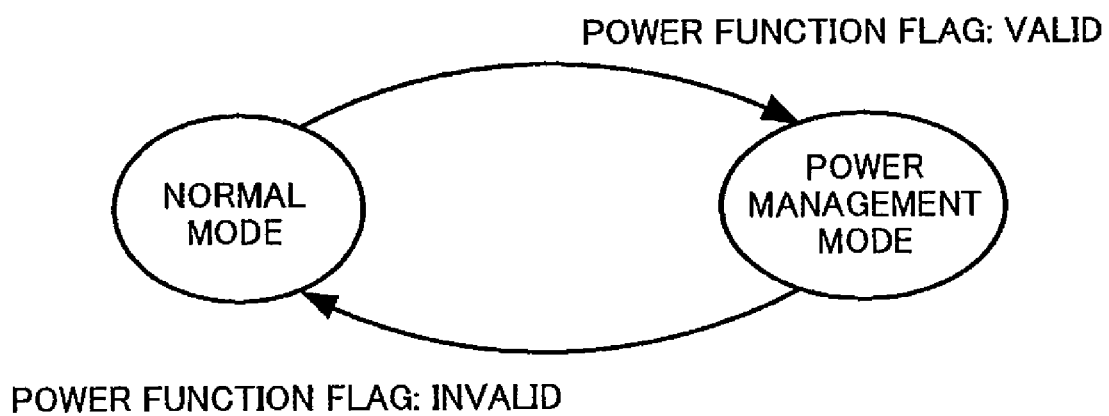
FIG. 7 is a diagram explaining a power control flag in a storage apparatus according to an embodiment of the invention.

The power management information is used in power management processing described in this embodiment, and includes, among others, a power function flag 700, a power setting table 800, a tray power management table 900, a tray detail table 1000, and an apparatus power table 1100. The power function flag 700 is a flag showing whether the storage apparatus 1 operates in a normal mode or a power management mode. As shown in FIG. 7, if the value of the power function flag is "valid," the operation mode for the storage apparatus 1 is switched to the power management mode, and if the value of the power function flag is "invalid," the operation mode for the storage apparatus 1 is switched to the normal mode. The other tables 800-1100 will be described later.

Returning to FIG. 5, the memory 122 also temporarily stores the data transferred between the host apparatus 3 and the hard disk drive 220. More specifically, the memory 122 functions also as cache memory used for data transfer between the host interface circuit 110 and the disk interface circuit 130.

The disk interface circuit 130 controls communication with the control circuit 240 in each tray 200. When the tray 200 serves as the extension unit 12, the disk interface circuit 130 may be connected to the control circuit 240 in the tray 200 via the extension switch 13. The disk interface circuit 130 also converts a logical address in the hard disk drive 220, which is given from the host apparatus 3, into a physical address.

The data transfer circuit 140 controls data transfer between the host interface circuit 110 and the main board 120 and between the main board 120 and the disk interface circuit 130, thereby achieving high-speed data transfer without the assistance of the processor 121.

The LAN interface circuit 150 controls communication with the management apparatus 4. In this embodiment, the management network 2A is composed of a LAN, and therefore, an Ethernet (registered trademark) board can be used as the LAN interface circuit 150.

FIG. 8 is a diagram explaining an example of the power setting table 800 according to an embodiment of the invention. The power setting table 800 is a table for managing the maximum available power for the storage apparatus 1 (maximum available power), and the maximum available power is set taking various circumstances (items) into consideration.

More specifically, as shown in FIG. 8, the power setting table 800 in this embodiment includes an item 801, a setting value 802, and a setting status 803. "Power," "ratio," and "number of trays" are given as settable items for the item 801, and predetermined values for the respective items are set.

The "power" is an item for setting the maximum available power for the storage apparatus 1 as an absolute value. The "ratio" is an item for setting the maximum available power as a ratio to the total power required by the entire storage apparatus 1. The "number of trays" is an item for setting the maximum available power as the number of simultaneously operable trays (maximum start-up trays) 200. Regarding each of the items, the setting status 803 specifies whether the present setting is valid or invalid.

In this embodiment, "4950 W" is set for the "power," "50%" is set for the "ratio," and "10 trays" is set for the "number of trays." Only the "ratio" shows a valid setting.

FIG. 9 is a diagram explaining an example of the tray power management table 900 according to an embodiment of the invention. The tray power management table 900 is a table for managing the setting content for each tray 200, and manages an entry in which a tray number 901, standard power 902, and a start-up status 903 are associated with one another.

The tray number 901 is identification information for uniquely identifying the trays 200, and the trays 200 are typically given sequential numbers starting from 0. The standard power 902 is the standard power within the specification for the tray 200. The start-up status 903 shows whether or not the tray 200 is started up when the storage apparatus 1 is turned on. For example, where the start-up status 903 is "on," when the storage apparatus 1 is turned on, the tray 200 is started up accordingly. On the contrary, where the status is "off," the start-up of the tray 200 is prohibited even when the storage apparatus 1 is turned on.

When a new tray 200 is added to the storage apparatus 1, the entry corresponding to the newly added tray 200 is added to the tray power management table 900.

FIG. 10 is a diagram explaining an example of the tray detail table 1000 according to an embodiment of the invention. The tray detail table 1000 is a table for managing the setting content for each of the hard disk drives incorporated in each of the trays 200. The tray detail table 1000 manages, for each tray number 1001, an entry in which a driver number 1002, standard power 1003, start-up status 1004, RAID group 1005, and setting status 1006 are associated with one another.

The tray number 1001 corresponds to the tray number 901 in the above-described tray power management table 900. The drive number 1002 is identification information for uniquely identifying the hard disk drives 220, and the hard disk drives 220 are typically given sequential numbers starting from 0 for each tray 200. The standard power 1003 is the standard power within the specification for the hard disk drive 220. The start-up status 1004 indicates whether or not the hard disk drive 220 is started up when the storage apparatus 1 is turned on. More specifically, the controller 100 can control the start-up or prohibition of start-up for each hard disk drive 220 in accordance with the settings in the tray detail table 1000. When the start-up status 903 for a certain tray 200 in the tray power management table 900 shown in FIG. 9 has been set to "off," the setting content for all the hard disk drives 220 belonging to the tray 200 is ignored. The RAID group number 1005 is a number for identifying RAID groups the hard disk drives 220 belong to. A group of hard disk drives 220 belonging to the same RAID group is treated as one virtual device. The setting status 1006 indicates whether the setting for each drive number 1002 is valid or invalid.

Note that the details for tray number "#1" and the subsequent numbers are omitted in FIG. 10; however, a table structure in each tray number 1001 is the same as that for tray number "#0."

Figure 11:
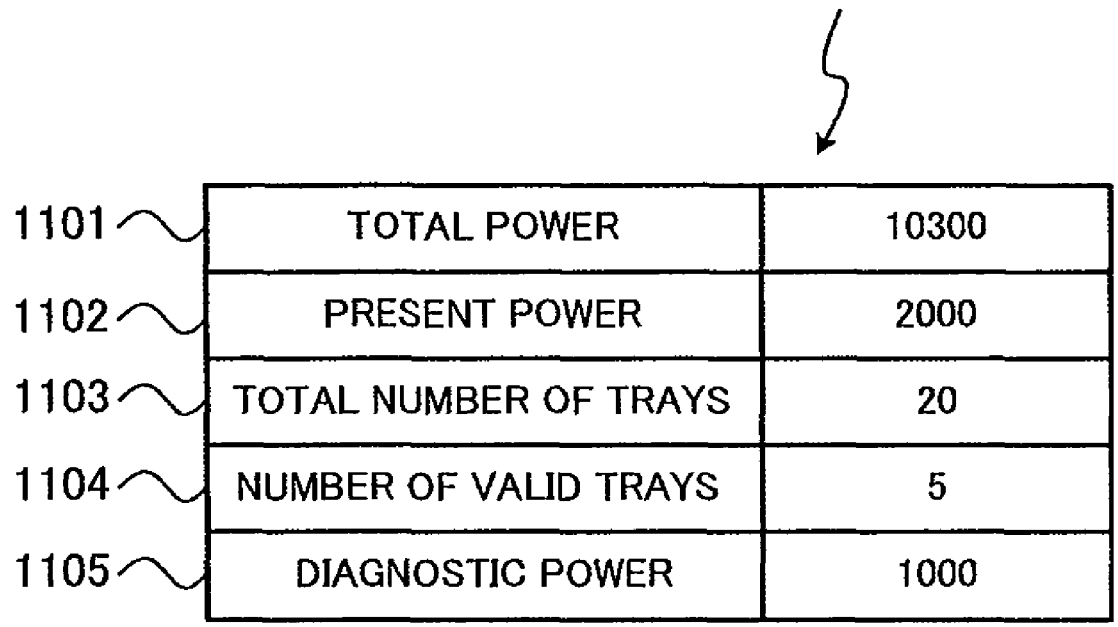
FIG. 11 is a diagram explaining an example of an apparatus power table stored in memory in a controller according to an embodiment of the invention.

FIG. 11 is a diagram explaining an example of the apparatus power table 1100 according to an embodiment of the invention. The apparatus power table 1100 is a table for managing basic power information for the storage apparatus 1, and is configured to include total power 1101, present power 1102, total number of trays 1103, number of valid trays 1004, and diagnostic power 1005.

The total power 1101 indicates the total power required by the storage apparatus 1. The total power 1101 is equal to the sum total of the standard power 902 in the tray power management table 900. The present power 1102 is equal to the sum total of the standard power 1003 from the entries in which the start-up status 1004 is set to "on" in the tray detail table 1000, regarding the trays 200 for which the start-up status 903 is set to "on" in the tray power management table 900.

The total number of trays 1103 is the total number of the trays 200 disposed in the storage apparatus 1, and is equal to the number of entries in the tray power management table 900. The number of valid trays 1104 is equal to the number of trays 200 for which the start-up status 903 has been set to "on" in the tray power management table 900.

The diagnostic power 1105 is the power reserved for a self-diagnostic for the hard disk drive 220.

Figure 12:
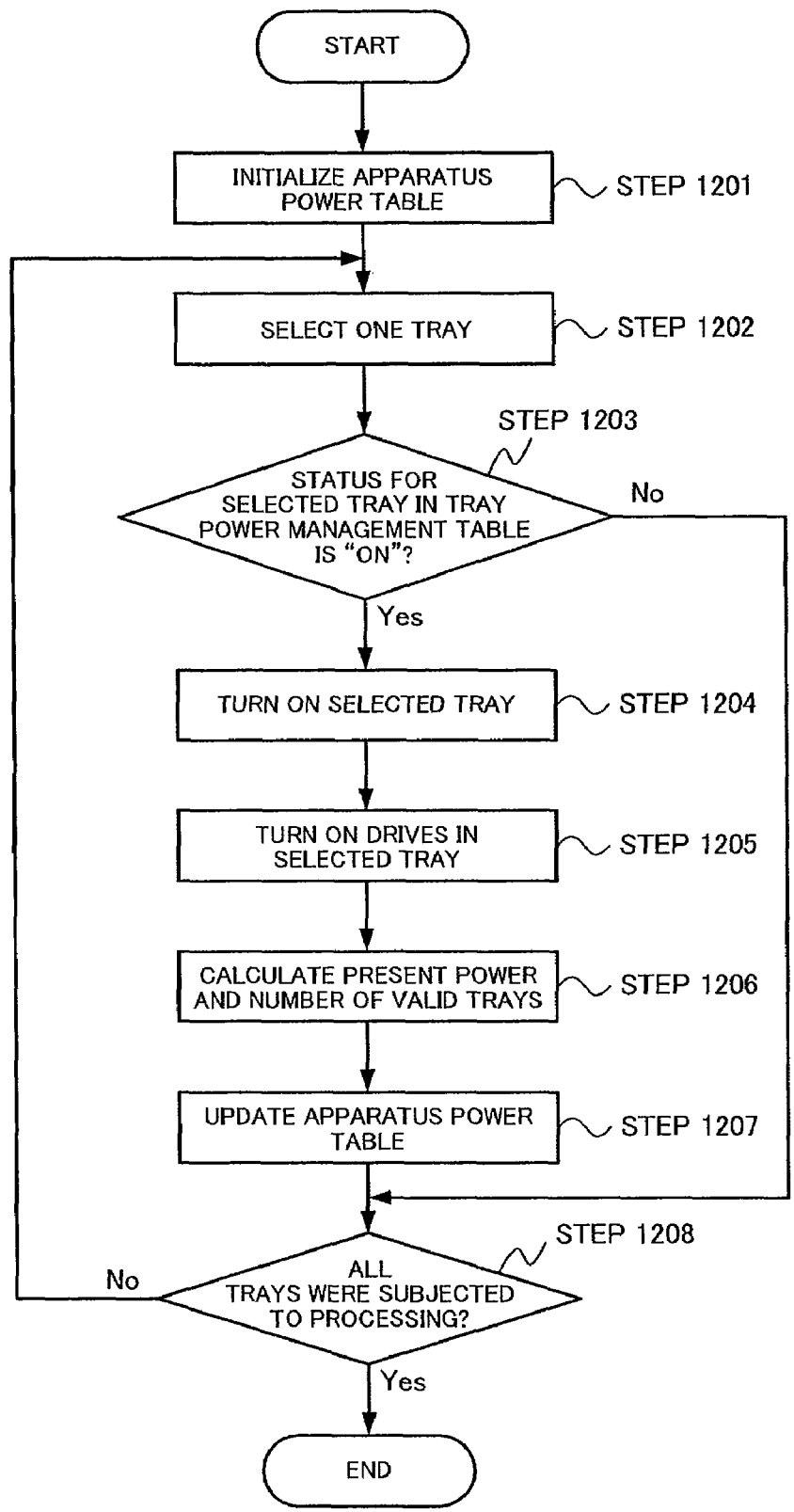
FIG. 12 is a flowchart explaining start-up processing executed when a storage apparatus is turned on according to an embodiment of the invention.

FIG. 12 is a flowchart explaining start-up processing executed when the storage apparatus 1 is turned on according to an embodiment of the invention. FIG. 12 explains part of start-up processing particularly related to power management processing in this embodiment. Startup processing is realized by, for example, the controller 100 executing an initial program under the control of the processor 121. Alternatively, start-up processing may be a part of a power management program, and may be executed by calling the power management program from the initial program under the control of the processor 121.

As shown in FIG. 12, when the storage apparatus 1 is turned on, the controller 100 initializes the apparatus power table 1100 loaded in the memory 122 (STEP 1201). Specifically, the controller 100 sets the value for each entry in the apparatus power table 1100 to 0.

Subsequently, regarding all the trays 200 loaded in the storage apparatus 1, the controller 100 conducts start-up in accordance with the setting content in the tray power management table 900 in the order of tray numbers. More specifically, the controller 100 first refers to the tray power management table 900, and selects one number for the tray number 901 (i.e., tray 200) (STEP 1202). Next, the controller 100 judges whether the start-up status 903 for the selected tray number 901 is "on" or "off" (STEP 1203). When the status for the selected tray number 901 is "off" (No in STEP 1203), the controller 100 judges whether or not all the tray numbers 901 were selected and subjected to processing, because the tray 200 identified by the selected tray number 901 does not need to be turned on (STEP 1207).

On the contrary, when the start-up status 903 for the selected tray number 901 is "on" (Yes in STEP 1203), the controller 100 performs control so that the tray 200 identified by the selected tray number is turned on (STEP 1204). More specifically, when the tray 200 is located in the basic unit 11, the controller 100 directly controls the power supply unit 300 in the basic unit 11. When the tray 200 is located in the extension unit 12, the controller 100 instructs the power supply distribution box 14 to power on the extension unit 12. Also, the controller 100 similarly turns on the hard disk drives 220 in accordance with the setting content in the tray detail table 1000 (STEP 1205).

Then, the controller 100 calculates the present power and the number of valid trays based on the power for the selected tray 200 in the tray power management table 900 (STEP 1206), and updates the apparatus power table 1100 based on the calculated present power and number of valid trays (STEP 1207).

The controller 100 judges whether or not all the trays were selected and subjected to processing (STEP 1208), and the above processing will be repeated until no unprocessed tray can be found.

As a result, each of the trays 200 disposed in the storage apparatus 1 is started up or prohibited from being started up in accordance with the setting content in the tray power management table 900. In this case, each hard disk drive 220 in each tray 200 is also started up or prohibited from being started up in accordance with the setting content in the tray detail table 1000.

Figure 13:
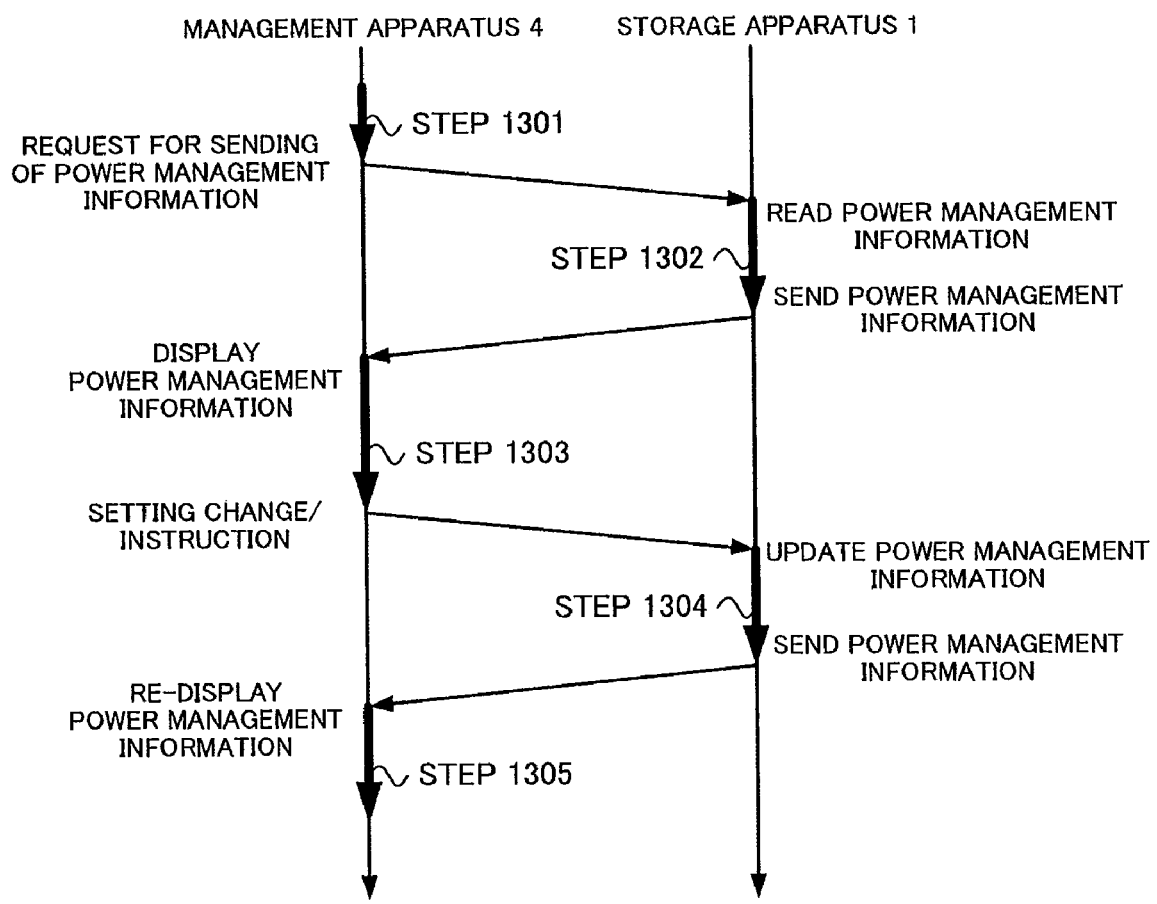
FIG. 13 is a diagram schematically explaining a procedure for power setting processing in a management apparatus according to an embodiment of the invention.

FIG. 13 is a sequence diagram schematically explaining a procedure for power setting processing in the management apparatus 4 according to an embodiment of the invention. Power setting processing is executed by the system administrator to, for example, operate the management apparatus 4 to conduct remote control over the storage apparatus 1. The management apparatus 4, under the control its processor, executes a management program to provide a system administrator with an operational environment for power setting processing.

As shown in FIG. 13, when being given an instruction from a system administrator, the management apparatus 4 first sends a request for sending power management information to the controller 100 in the storage apparatus 1 (STEP 1301). In response to the request, the controller 100 reads the power management information (various tables 800-1100) from the memory 122, and sends it to the management apparatus 4 (STEP 1302).

The management apparatus 4 creates setting screen data based on the power management information acquired by the controller 100, and displays a setting/confirmation window on a user interface based on the data. The setting/confirmation window is designed to include some sub-windows. A system administrator can set settings interactively via the setting/confirmation window. The setting window will be described later. When being given an instruction for executing settings from a system administrator, the management apparatus 4 sends a setting execution request to the controller 100 (STEP 1303). The controller 100 updates the content of the power management information in accordance with the sent setting execution request, and sends the update result to the management apparatus 4 (STEP 1304). Upon receiving the update result, the controller 100 updates the display content in the setting/confirmation window on the user interface (STEP 1305).

By way of the above, a system administrator can conduct power management for the storage apparatus 1 by operating the management apparatus 4.

Figure 14:
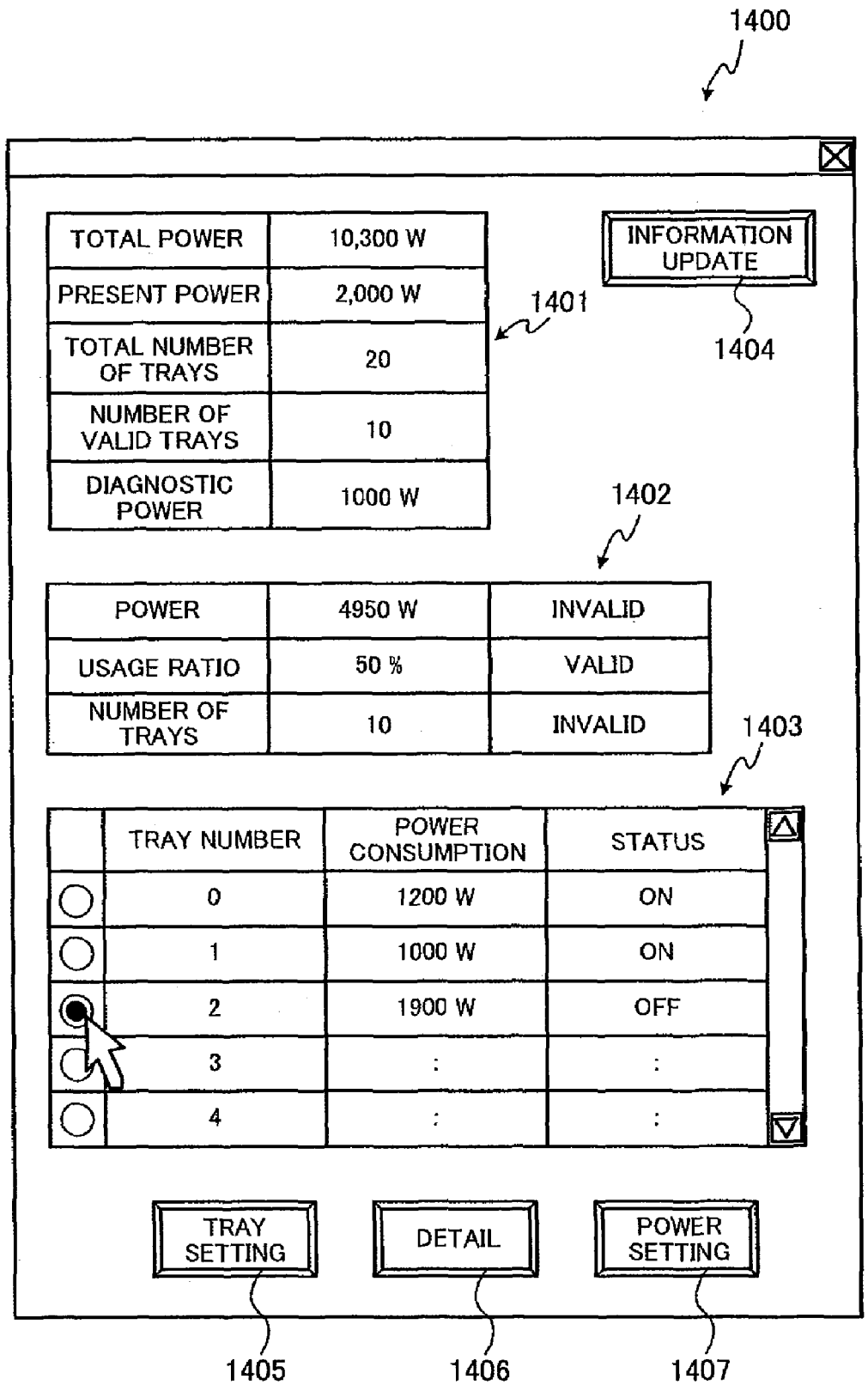
FIG. 14 is a diagram showing an example of a setting/confirmation window displayed on a management apparatus according to an embodiment of the invention.

FIG. 14 is a diagram showing an example of a setting/confirmation window 1400 displayed on the management apparatus 4 according to an embodiment of the invention. As shown in FIG. 14, the setting/confirmation window 1400 includes, as areas for displaying power management information, an apparatus power information display area 1401, a power setting information display area 1402, and a tray power management information display area 1403, which respectively display the content of the apparatus power table 1100, the power setting table 800, and the tray power management table 900.

The setting/confirmation window 1400 is configured to include some button objects to receive user actions. In this example, prepared as the button objects are an information update button 1404, a tray setting button 1405, a detail button 1406, and a power setting button 1407. The tray power management information display area 1403 is provided with checkboxes each for selecting the tray 200 to be a setting target, and a system administrator can check the checkbox by using a pointing device such as a mouse.

The information update button 1404 is a button for updating the power management information displayed in the setting/confirmation window. When the information update button 1404 is selected, the management apparatus 4 acquires the content of the various tables 800 to 1100 from the controller 100 to display the content.

The tray setting button 1405 is a button for executing the setting for the tray 200 indicated by the tray number checked in the checkbox in the tray power management information display area 1403. When a system administrator wants to execute detailed settings for the hard disk drive 220 in the tray 200, the system administrator selects the detail button 1406 described later in advance to set settings for the RAID group in the tray 200 before selecting the tray setting button 1405.

Figure 15:
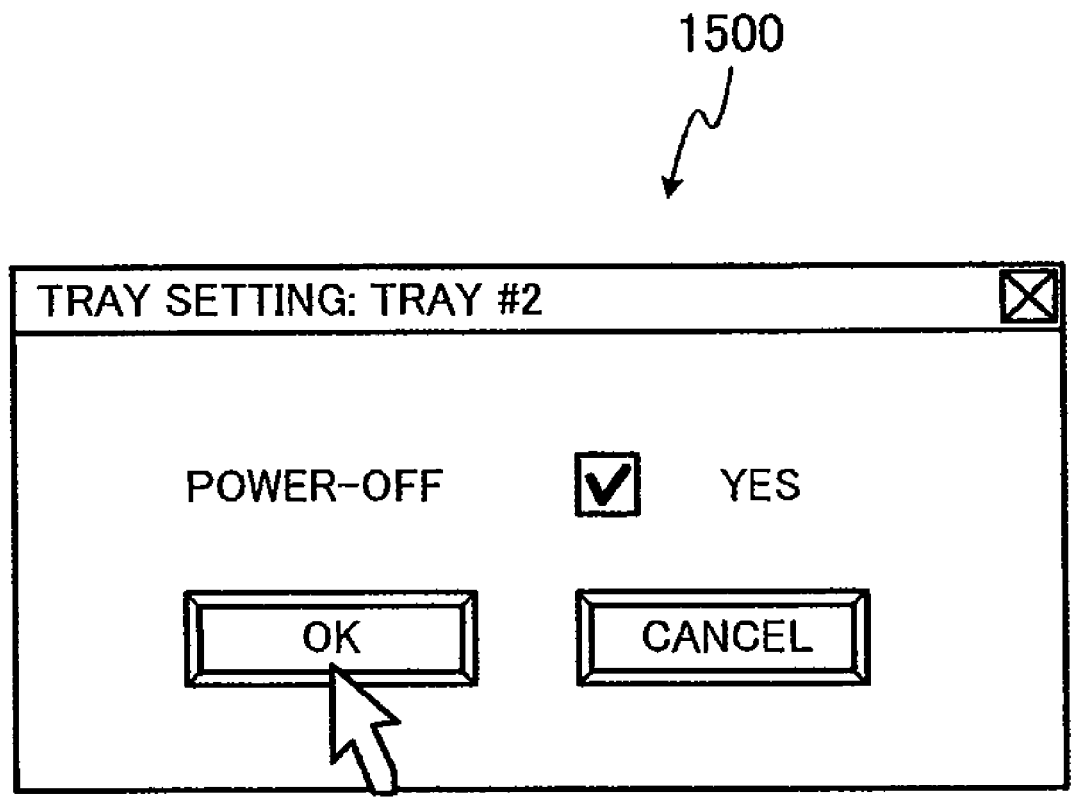
FIG. 15 is a diagram showing an example of a tray setting window displayed on a management apparatus according to an embodiment of the invention.

When the tray setting button 1405 is selected, the management apparatus 4 displays the sub-window 1500 (tray setting window) shown in FIG. 15, and prompts a system administrator to make a selection between power-on and power-off for the tray 200 as the setting target. When a system administrator wants the setting target tray 200 to be turned off, the system administrator checks the relevant checkbox. In this example, power-off has been selected for tray number "#2" for which a checkbox was checked in the tray power management information display area 1403. When a system administrator selects the OK button, the management apparatus 4 creates a setting execution request based on the setting content, and sends the setting execution request to the controller 100. The setting execution request includes, for example, a setting target tray number and a flag concerning whether or not power-on is conducted.

Figure 16:
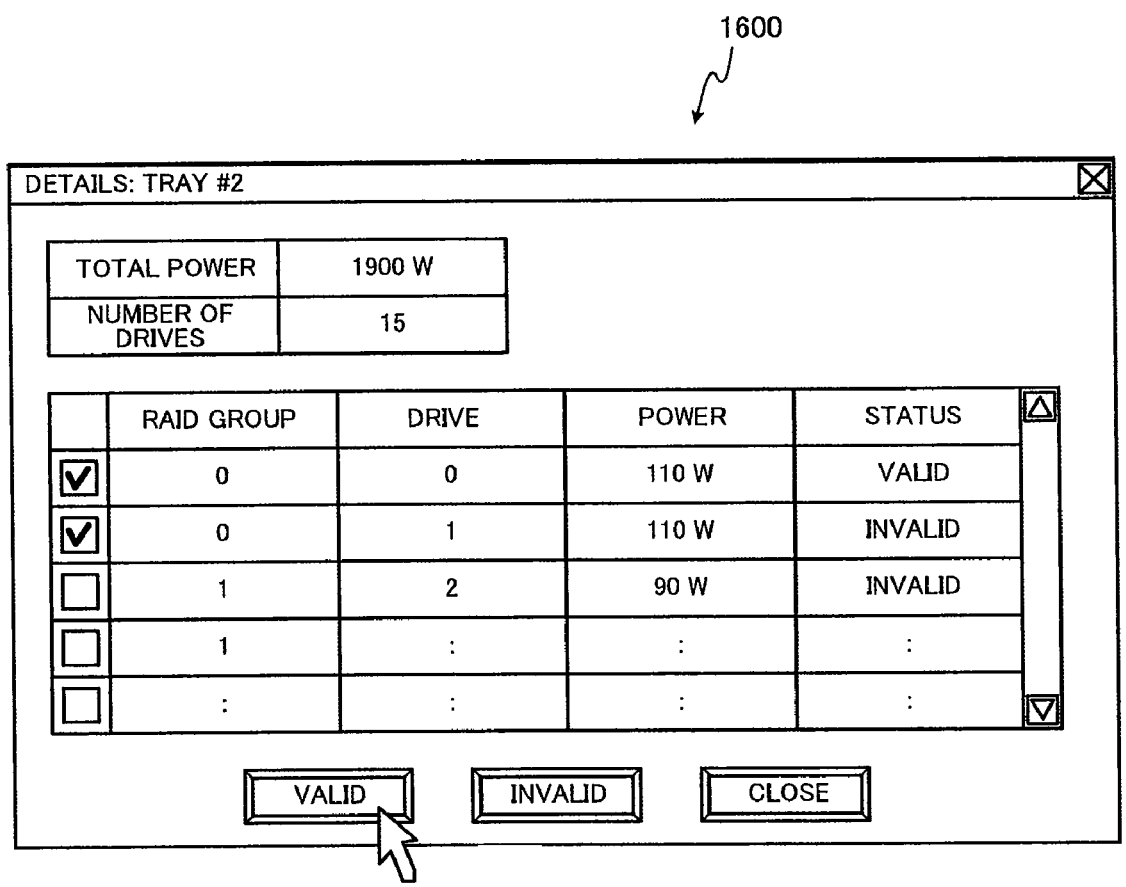
FIG. 16 is a diagram showing an example of a tray detail setting window displayed on a management apparatus according to an embodiment of the invention.

The detail button 1406 is a button for executing settings for the hard disk drive loaded in the tray 200 indicated by the tray number for which the relevant checkbox has been checked in the tray power management information display area 1403. When the detail button 1406 is selected, the management apparatus 4 pops up the sub-window 1600 (tray detail setting window) shown in FIG. 16. The sub-window 1600 shows the total power and the total number of hard disks for the setting target tray 200, and prompts a system administrator to make a selection on whether power-on is set to be valid or invalid (power-off) for the hard disk drives 220 in the tray setting target tray 200. In this embodiment, the selection for the hard disk drives 220 is conducted on a RAID group basis. In other words, when the checkbox for one of the hard disk drives belonging to a certain RAID group is checked, the management apparatus 4 regards this check as a check for the RAID group. When a system administrator wants a particular hard disk drive (i.e., the RAID group including the hard disk drive) to be turned off, the system administrator checks the relevant checkbox, and selects the valid button. In response to this, the management apparatus 4 returns control to the setting/confirmation window 1400 shown in FIG. 14.

Figure 17:
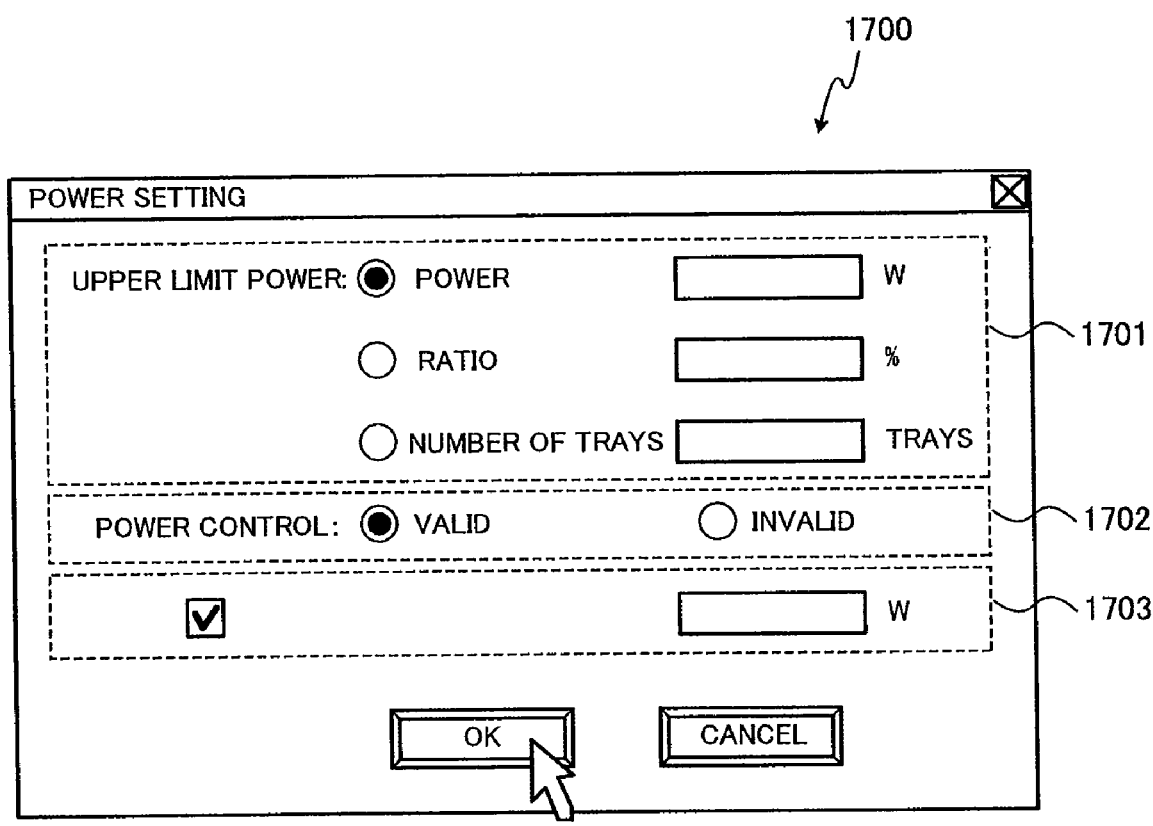
FIG. 17 is a diagram showing an example of a power setting window displayed on a management apparatus according to an embodiment of the invention.

The power setting button 1407 is a button for setting the maximum available power for the storage apparatus 1. When the power setting button 1407 is selected, the management apparatus 4 pops up a sub-window 1700 (power setting window) shown in FIG. 17, and prompts a system administrator to set settings for the maximum available power for the storage apparatus 1. In this embodiment, the sub-window 1700 includes a maximum available power setting area 1701, a power control setting area 1702, and a diagnostic power setting area 1703. The maximum available power setting area 1701 is an area for setting the maximum available power for the storage apparatus 1 taking various circumstances (items) into consideration. The maximum available power is set based on one of the items, "power," "ratio," and "number of trays." The "power" is an item selected for setting the maximum available power for the storage apparatus 1 as an absolute value. The "ratio" is an item selected for setting the maximum available power for the storage apparatus 1 as a ratio to the total power. The "number of trays" is an item selected for setting the maximum available power for the storage apparatus 1 as the number of simultaneously operable trays 200.

In this embodiment, any one of the items, "power," "ratio" and "number of trays" is selected. However, selection is not limited to a single item, and plural items may also be selected.

The power control setting area 1702 is an area for making a selection on whether the storage apparatus 1 is made to operate in a normal mode or a power management mode. A system administrator selects "valid" when wanting the storage apparatus 1 to operate in the power management mode. When a system administrator selects the OK button, the management apparatus 4 creates a setting execution request based on the setting content, and sends the setting execution request to the controller 100.

The diagnostic power setting area 1703 is an area for setting the power to be reserved for self-diagnostics for the hard disk drives 220. When the checkbox in the diagnostic power setting area 1703 has been checked, the power obtained by subtracting the diagnostic power set in diagnostic power setting area 1703 from the maximum available power set in the maximum available power setting area 1701 corresponds to the maximum power usable in the storage apparatus 1.

Figure 18:
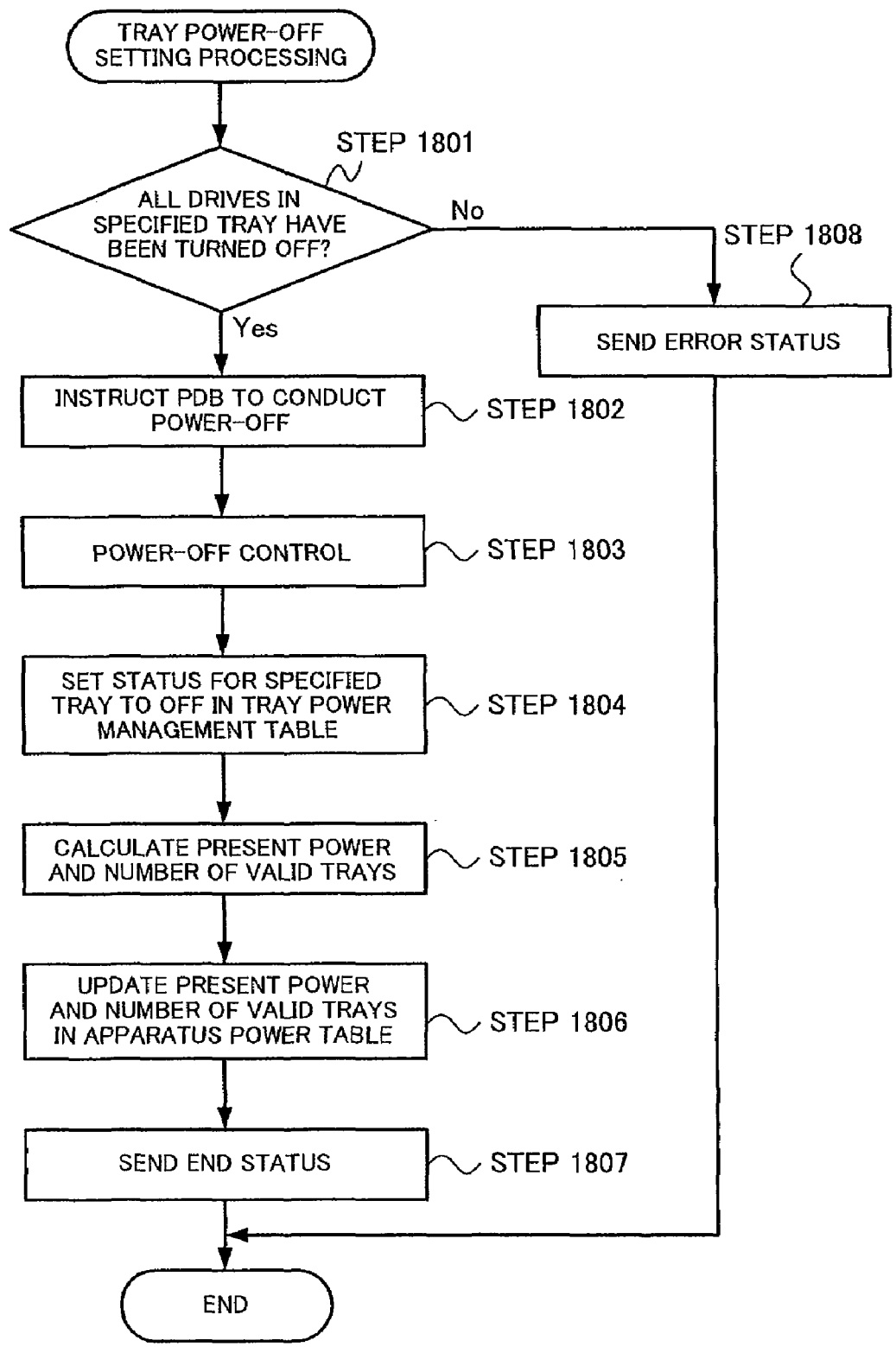
FIG. 18 is a flowchart explaining tray power-off processing executed by a storage apparatus according to an embodiment of the invention.

FIG. 18 is a flowchart explaining tray power supply control processing in the storage apparatus 1 according to an embodiment of the invention. More specifically, FIG. 18 explains tray power supply control processing executed upon receipt of a tray power-off setting execution request from the management apparatus 4. Tray power supply control processing is realized by, for example, the controller 100 in the storage apparatus 1 executing a power management program under the control of the processor 121.

As shown in FIG. 18, upon receiving a power-off setting execution request from the management apparatus 4, the controller 100 judges whether or not all the hard disk drives 220 in the tray 200 specified by the setting execution request have been turned off (STEP 1801). When the controller 100 determines that not all hard disk drives 220 have been turned off, i.e., the controller 100 determines that at least one of the hard disk drives 220 is still turned on (No in STEP 1801), the controller 100 sends an error status to the management apparatus 4 (STEP 1808), and terminates processing.

On the contrary, the controller 100 executes the following processing when the controller 100 determines that all the hard disk drives 220 have been turned off (Yes in STEP 1801).

The controller 100 first instructs the power supply distribution box 14 to turn off the tray 200 as a setting target (STEP 1802). More specifically, the controller 100 outputs a control signal for turning off the setting target tray 200 to the power supply distribution box 14. In response to this, the power supply distribution box 14 turns off the setting target tray 200 via control over an internal switch connected to the setting target tray 200 (STEP 1803).

Next, the controller 100 refers to the tray power management table 900, and sets the start-up status 903 in the entry identified by the tray number specified by the setting request to "off" (STEP 1804). The controller 100 then re-calculates the present power and number of valid trays in accordance with the entries in the tray power management table 900 (STEP 1805), and updates the values of the present power 1102 and the number of valid trays 1104 in the apparatus power table 1100 (STEP 1806). The controller 100 then sends an end status to the management apparatus 4 (STEP 1807), and terminates processing for the tray power-off setting execution request.

As a result, the storage apparatus 1 confirms the power supply state for the hard disk drive 220 in the specified tray 200 in accordance with the tray power-off setting execution request from the management apparatus 4, and then turns off the tray 200. The tray 200 is turned off, and the number of trays 200 now in operation in the storage apparatus 1 and the power consumed by the trays 200 are updated immediately, with a system administrator being able to confirm the result.

Figure 19:
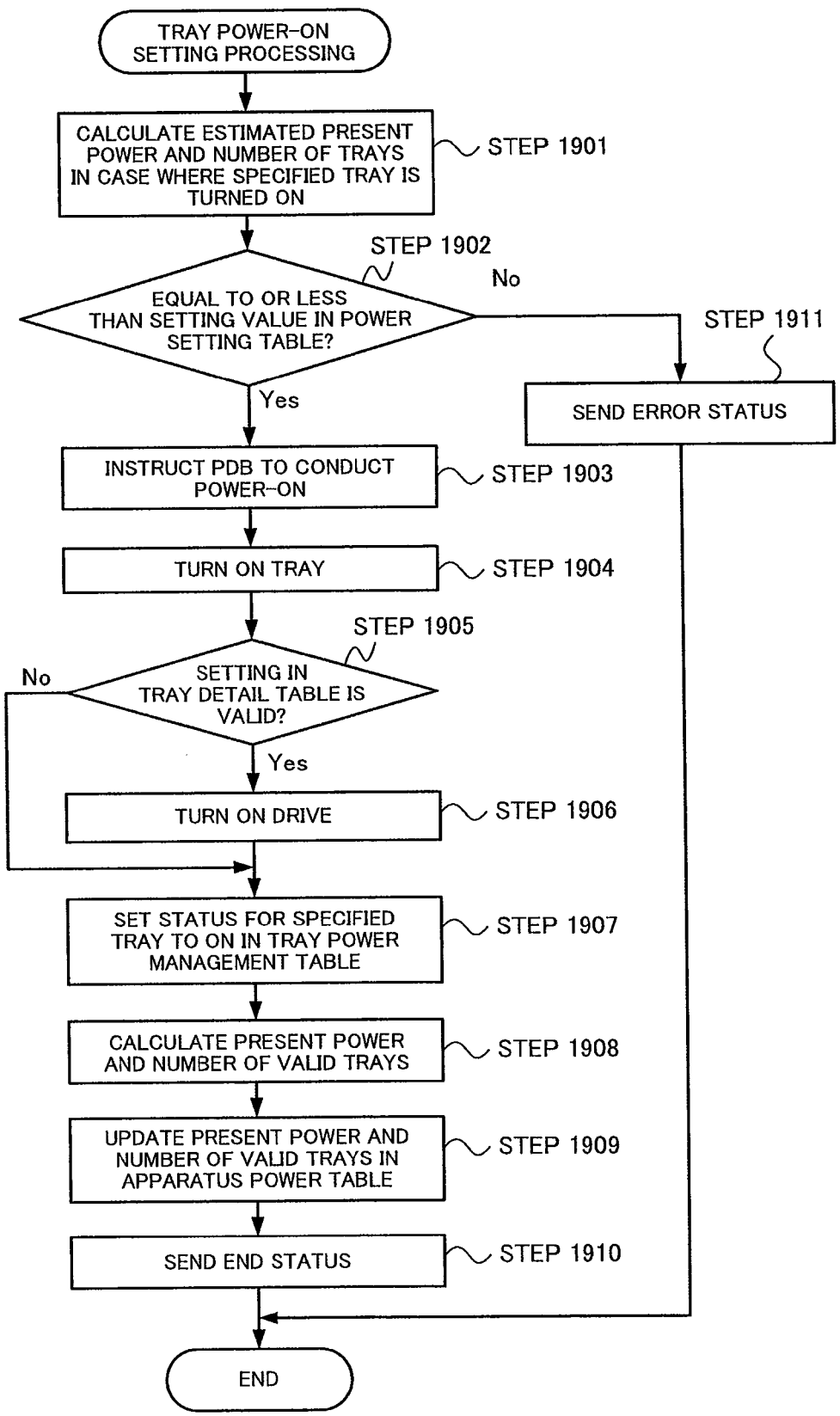
FIG. 19 is a flowchart explaining tray power-on processing executed by a storage apparatus according to an embodiment of the invention.

FIG. 19 is a flowchart explaining tray power supply control processing in the storage apparatus 1 according to an embodiment of the invention. Specifically, FIG. 19 explains tray power supply control processing executed upon receipt of a tray power-on setting execution request from the management apparatus 4.

Referring to FIG. 19, upon receiving a power-on setting execution request from the management apparatus 4, the controller 100 in the storage apparatus 1 refers to the tray power management table 900, and calculates the estimated total power and estimated total number of trays when the tray 200 specified by the setting execution request is turned on (STEP 1901). More specifically, the estimated total power is the power obtained by adding the standard power for the tray 200 specified by the setting execution request to the present power indicated in the apparatus power table 1100. Also, the estimated total number of trays is the number obtained by adding one (the tray 200 specified by the setting execution request) to the number of valid trays indicated in the apparatus power table 1100.

Next, the controller 100 judges whether or not the calculated estimated total power is equal to or less than the maximum available power calculated based on the setting value regarding the item, among the items in the power setting table 800, for which the setting status 803 is "valid" (STEP 1902). The maximum available power mentioned here is net power not including diagnostic power when the diagnostic power has been set. When the controller 100 determines that the calculated total power is not equal to or less than the setting value set in the power setting table 800 (No in STEP 1902), the controller 100 send an end status to the management apparatus 4 (STEP 1910), and terminates processing.

On the contrary, when the controller 100 executes the following processing when the controller 100 determines that the calculated total power is equal to or less than the setting value set in the power setting table 800 (Yes in STEP 1902).

The controller 100 first instructs the power supply distribution box 14 to turn on the setting target tray 200 (STEP 1903). More specifically, the controller 100 outputs a control signal for turning on the setting target tray 200 to the power supply distribution box 14. In response, the power supply distribution box 14 turns on the setting target tray 200 via control over the internal switch connected to the setting target tray 200 (STEP 1904).

The controller 100 next refers to the tray detail table 1000, and judges whether or not, for the tray number 1001 specified by the setting execution request, the drive number 1002 for which the setting status 1006 is "valid" exists (STEP 1905). When the controller 100 determines that the drive number 1002 for which the setting status 1006 is "valid" does not exist (No in STEP 1905), the controller 100 proceeds to the processing in STEP 1907. If the controller 100 determines that the drive number 1002 for which the setting status 1006 is "valid" exists (Yes in STEP 1905), the controller 100 performs control so that the hard disk drive 220 identified by the relevant driver number 1002 is turned on (STEP 1906). Subsequently, the controller 100 sets the start-up status 903 in the relevant entry in the tray power management table 900 to "on" (STEP 1907).

Then, the controller 100 calculates the present power and the number of valid trays based on the entries in the tray power management table 900 (STEP 1908), and updates the values of the present power 1102 and the number of valid trays 1104 in the apparatus power table 1100 (STEP 1909). Then, the controller 100 sends an end status to the management apparatus 4 (STEP 1910), and terminates processing.

As a result, the storage apparatus 1 checks in advance whether or not the power usage for the storage apparatus 1 which derives from the tray power-on exceeds the maximum available power in response to the tray power-on setting execution request from the management apparatus 4, and turns on the relevant tray 200. The tray 200 is turned on, and the number of trays 200 now in operation in the storage apparatus 1 and the power consumed by the trays 200 are updated immediately, with a system administrator being able to confirm the result.

Figure 20:
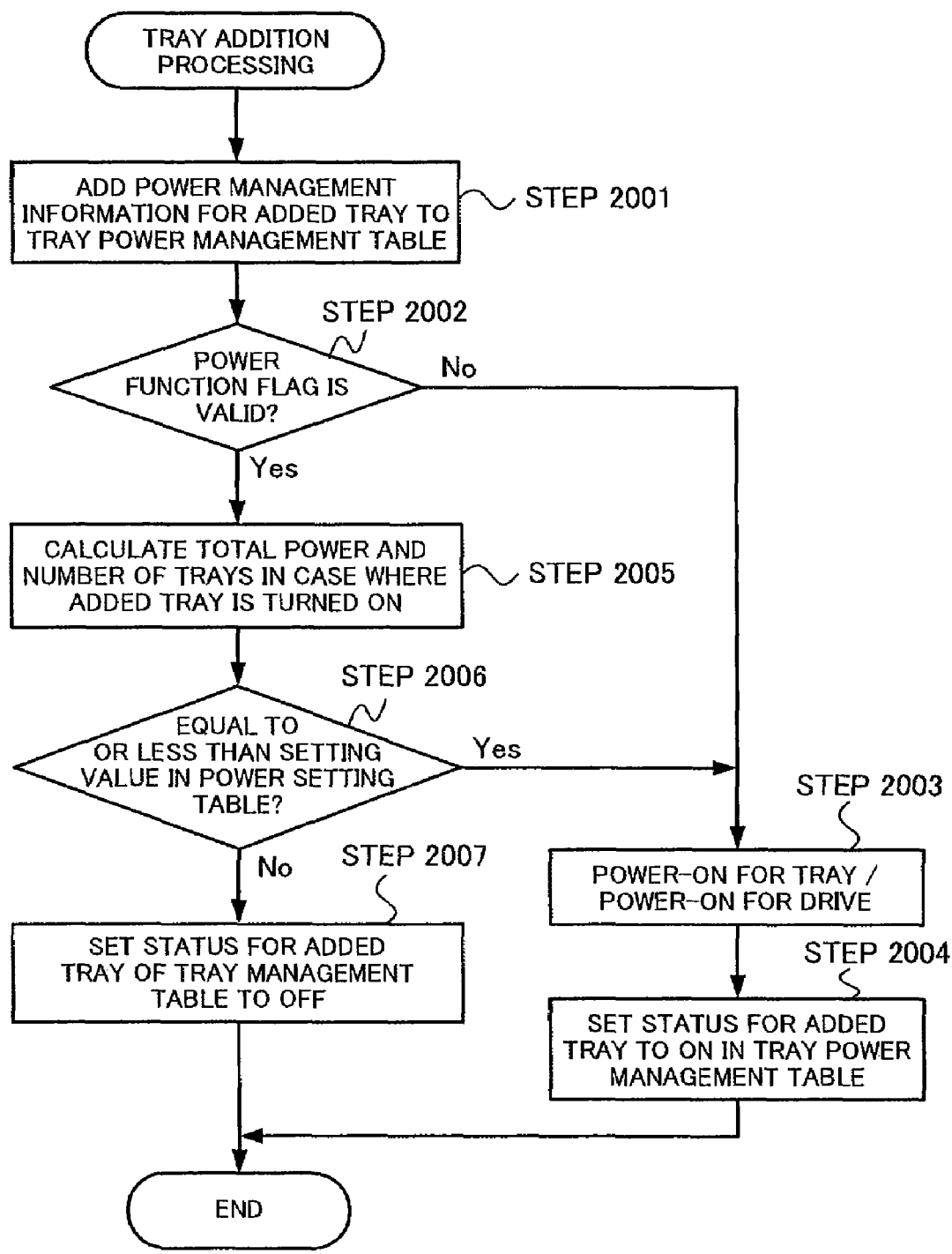
FIG. 20 is a flowchart explaining tray addition processing executed by a storage apparatus according to an embodiment of the invention.

FIG. 20 is a flowchart explaining tray addition processing executed by the storage apparatus 1 according to an embodiment of the invention. More specifically, FIG. 20 explains the processing executed upon receipt of a tray addition setting request from the management apparatus 4. Tray addition processing is realized by, for example, the controller 100 in the storage apparatus 1 executing a system management program under the control of the processor 121.

When adding a new tray 200 to the storage apparatus 1, a system administrator operates the management apparatus 4 to register the device information about the tray 200 to be added in system configuration information in the storage apparatus 1. The device information includes, among others, power management information about the tray number, the standard power for the tray 200, etc. When receiving a setting instruction from a system administrator, the management apparatus 4 sends a tray addition setting request based on the input device information to the controller 100 in the storage apparatus 1.

After receiving the tray addition setting request, the controller 100 updates the tray power management table 900 based on the power management information in the device information included in the tray addition setting request, as shown in FIG. 20 (STEP 2001). More specifically, when the tray 200 is added, the controller 100 adds a new entry to the tray power management table 900, and sets the tray number 901 and the relevant standard power in the added entry.

The controller 100 next judges whether or not the value of the power function flag 700 is valid (STEP 2002). When the controller 100 determines that the value of the power function flag 700 is "invalid" (No in STEP 2002), the added tray 200 is turned on, and the hard disk drives 220 in the added tray 200 are turned on so that the storage apparatus 1 is started up in a normal mode (STEP 2003). Then, the controller 100 sets the start-up status 903 for the added tray 200 in the tray power management table 900 to "on" (STEP 2004), and terminates tray addition processing.

On the contrary, when the controller 100 determines that the value of the power function flag 700 is "valid" (Yes in STEP 2002), the controller 100 refers to the tray power management table 900, and calculates the total power and the total number of trays obtained when the added tray 200 is turned on (STEP 2005). Subsequently, the controller 100 judges whether or not the calculated total power is equal to or less then the maximum available power calculated based on the setting value for which the setting status 803 is "valid" in the power setting table 800 (STEP 2006). When the controller 100 determines that the calculated total power is not equal to or less then the maximum available power set in the power setting table 800 (No in STEP 2006), the controller 100 sets the start-up status 903 for the added tray 200 in the tray power management table 900 to "off" (STEP 2007), and terminates tray addition processing.

On the contrary, when the controller 100 determines that the calculated total power is equal to or less then the maximum available power set in the power setting table 800 (Yes in STEP 2006), the controller 100 proceeds to the above-described processing in STEP 2003. More specifically, the controller 100 turns on the added tray, turns on the hard disk drives 220 in the added tray 200, then sets the start-up status 903 for the added tray 200 in the tray power management table 900 to "on" (STEP 2004), and terminates tray addition processing.

The storage apparatus 1 may send the power management information changed via tray addition processing to the management apparatus 4, and the management apparatus 4 may display the power management information on the user interface.

By way of this, the storage apparatus 1 can reflect the device information for the tray 200 added in response to the tray addition setting execution request from the management apparatus 4 in the power management information. The storage apparatus 1 also checks in advance whether or not the power usage for the storage apparatus 1 which derives from the tray addition exceeds the maximum available power, and turns on the relevant tray 200. The added tray 200 is turned on, and the number of trays 200 now in operation in the storage apparatus 1 and the power consumed by the trays 200 are updated immediately, with a system administrator being able to confirm the result.

A wide variety of storage apparatuses, each loaded with a large number of storage devices such as hard disk drives, can be utilized in the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus comprising:
 a plurality of tray units each mounting a plurality of disk drives; and
 a controller configured to control access to the disk drives in response to an access request from a host apparatus, wherein the controller includes:
 a tray power management table in which standard power and a start-up power supply status are associated with each other for each of the tray units;
 an apparatus power table that manages the total power required by the tray units and present power consumed by the tray units; and
 a power setting table that defines the maximum available power relative to the total power and maximum number of trays which are powered on simultaneously, and
 wherein the controller is configured, responsive to receiving a power-on setting request for at least one tray unit of the tray units, to:
 calculate estimated power based on the standard power for the at least one tray unit and the present power, and total number of trays which are powered on,
 determine whether the estimated power is equal to or less than the maximum available power in the power setting table, and the total number of trays which are powered is equal to or less than the maximum number of trays which are powered on simultaneously in the power setting table,
 turn on the at least one tray unit when the estimated power is equal to or less than the maximum available power and the total number of trays which are powered on is equal to or less than the maximum number of trays which are powered on simultaneously, and then turn on one or more specified disk drives in the at least one tray unit without considering standard power of the specified disk drives, and
 send an error status when the estimated power is more than the maximum available power or the total number of trays which are powered on is more than the maximum number of trays which are powered on simultaneously.

2. The storage apparatus according to claim 1, wherein the controller, when receiving a power-off setting request for at least one tray unit of the tray units, determines whether the at least one tray unit can be turned off based on the standard power for the at least one tray unit in the tray power management table and the present power in the apparatus power table, and the controller, upon determining that the at least one tray unit can be turned off, performs control to turn off the at least one tray unit.

3. The storage apparatus according to claim 1, wherein the present power is calculated based on the standard power for the tray unit for which the start-up power supply status is "on" from among the tray units.

4. The storage apparatus according to claim 1, further comprising:
 a power supply unit; and
 a power supply distribution unit connected to the tray units and configured, under the control of the controller, to distribute power from the power supply unit to the tray units.

5. The storage apparatus according to claim 4, further comprising an extension switch unit that connects the controller to the tray units connected to the power supply distribution unit.

6. The storage apparatus according to claim 1, wherein the controller is further configured to receive a power supply setting request from a management apparatus, and to change the start-up status for the tray unit specified by the power supply setting request in the tray power management table.

7. The storage apparatus according to claim 6, wherein the controller is further configured to update the present power in the apparatus power table based on the standard power in the tray power management table.

8. The storage apparatus according to claim 1, wherein the controller further includes a detail table in which standard power and a start-up power supply status are associated with each other for each of the disk drives in each of the tray units.

9. The storage apparatus according to claim 8, wherein the controller is further configured to perform control not to turn on the disk drive for which the start-up power supply status has been set to "off" for the at least one tray unit that has been determined as one to be turned on.

10. A management apparatus for managing a storage apparatus including a plurality of tray units each mounting a plurality of disk drives and a controller configured to control access to the disk drives in response to an access request from a host apparatus, the management apparatus comprising:
- a processor; and
- a user interface configured to be controlled by the processor,
  wherein the processor is configured to perform control to display a window for setting maximum available power relative to total power required by the tray units on the user interface, and to set the maximum available power for the controller based on user input via the user interface, and
  wherein the processor is further configured to perform control to cause the controller, responsive to receiving a power-on setting request from the management apparatus for at least one tray unit of the tray units, to:
- calculate estimated power based on standard power for the at least one tray unit and present power consumed by the tray units, and total number of trays which are powered on,
- determine whether the estimated power is equal to or less than the maximum available power, and the total number of trays which are powered is equal to or less than the maximum number of trays which are powered on simultaneously,
- turn on the at least one tray unit when the estimated power is equal to or less than the maximum available power and the total number of trays which are powered on is equal to or less than the maximum number of trays which are Powered on simultaneously, and then turn on one or more specified disk drives in the at least one tray unit without considering standard power of the specified disk drives, and
- send an error status when the estimated power is more than the maximum available power or the total number of trays which are powered on is more than the maximum number of trays which are powered on simultaneously.

11. The management apparatus according to claim 10, wherein the processor acquires power management information from the controller, and performs control to display the acquired power management information on the user interface.

12. The management apparatus according to claim 11, wherein the power management information is at least one of tray power management information in which standard power and a start-up power supply status are associated with each other for each of the tray units; apparatus power information that manages the total power required by the tray units and present power consumed by the tray units; and power setting information that defines maximum available power relative to the total power.

13. The management apparatus according to claim 10, wherein the maximum available power is set to at least one of an absolute value relative to the total power, a ratio to the total power, and the number of simultaneously operable tray units relative to the total number of the tray units.

14. A method of controlling electrical power used in a storage apparatus including a plurality of tray units each mounting a plurality of disk drives and a controller configured to control access to the disk drives in response to an access request from a host apparatus, the method comprising:
- providing, under control of the controller, a tray power management table in which standard power and a start-up power supply status are associated with each other for each of the tray units, an apparatus power table that manages total power required by the tray units and present power consumed by the tray units, and a power setting table that defines maximum available power relative to the total power;
- receiving, under control of the controller, a power-on setting request to at least one tray unit of the tray units;
- calculating estimated power based on the standard power for the at least one tray unit and the present power, and total number of trays which are powered on,
- determining whether the estimated power is equal to or less than the maximum available power in the power setting table, and the total number of trays which are powered is equal to or less than the maximum number of trays which are powered on simultaneously in the power setting table,
- turning on the at least one tray unit when the estimated power is equal to or less than the maximum available power and the total number of trays which are powered on is equal to or less than the maximum number of trays which are powered on simultaneously, and then turning on one or more specified disk drives in the at least one tray unit without considering standard power of the specified disk drives, and
- sending an error status when the estimated power is more than the maximum available power or the total number of trays which are powered on is more than the maximum number of trays which are powered on simultaneously.

15. The storage apparatus according to claim 2, wherein the controller is configured, upon determining that the estimated power is equal to or less than the maximum available power, to turn off the at least one tray unit.

16. The method according to claim 14, further comprising the steps of:
- determining, under control of the controller, whether the at least one tray unit can be turned off based on the standard power for the at least one tray unit in the tray power management table and the present power; and
- turning off, under the control of the controller, the at least one tray unit upon determining that the at least one tray unit can be turned off.

* * * * *